US009430632B2

(12) United States Patent
Ren (10) Patent No.: US 9,430,632 B2
(45) Date of Patent: Aug. 30, 2016

(54) FUNCTION PERFORMING APPARATUS AND STORAGE MEDIUM

(71) Applicant: Brother Kogyo Kabushiki Kaisha, Nagoya-shi, Aichi-ken (JP)

(72) Inventor: Yongyong Ren, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/499,584

(22) Filed: Sep. 29, 2014

(65) Prior Publication Data

US 2015/0096015 A1    Apr. 2, 2015

(30) Foreign Application Priority Data

Sep. 30, 2013  (JP) .................................. 2013-204498

(51) Int. Cl.
G06F 21/34      (2013.01)
G06F 21/35      (2013.01)

(52) U.S. Cl.
CPC .................................... *G06F 21/35* (2013.01)

(58) Field of Classification Search
CPC ............................... G06F 21/35; G06F 21/34
USPC .......................................................... 726/20
See application file for complete search history.

(56) References Cited

U.S. PATENT DOCUMENTS

2004/0133779 A1* 7/2004 Sato ........................ H04L 63/08
                                                           713/168
2009/0318190 A1* 12/2009 Shinozaki ............... G06F 21/88
                                                           455/558

FOREIGN PATENT DOCUMENTS

JP      2010-198086 A     9/2010
WO      2007-105525 A1    9/2007

* cited by examiner

*Primary Examiner* — Kambiz Zand
*Assistant Examiner* — Aubrey Wyszynski
(74) *Attorney, Agent, or Firm* — Banner & Witcoff, Ltd.

(57) ABSTRACT

A function performing apparatus includes a function performing unit, an operation unit, a processor and memory. The function performing apparatus receives a first instruction from a portable device, determines whether first authentication information is to be registered in an authentication memory, registers the first authentication information in authentication the memory, transmits the first authentication information, receives a second instruction including the first authentication information from the portable device, changes a state of the function performing apparatus from a non-permission state to a permission state if the second instruction is received while the first authentication information is registered in the authentication memory and changes the state from the non-permission state to the permission state if second authentication information is input to the function performing apparatus by the operation unit while the second authentication information is registered in the authentication memory.

14 Claims, 5 Drawing Sheets

FUNCTION PERFORMING APPARATUS AND STORAGE MEDIUM

CROSS-REFERENCE TO RELATED APPLICATIONS

This application claims priority from Japanese Patent Application No. 2013-204498 filed on Sep. 30, 2013, the entire contents of which are incorporated herein by reference.

TECHNICAL FIELD

Aspects of the present invention relate to a function performing apparatus capable of performing a specific function.

BACKGROUND

A known printer includes a sensor and an IC reader/writer. The printer performs a preparation process, thereby storing a combination of an ID number of a portable IC terminal and biometrics data read from a human body in the printer. In the preparation process, if the portable IC terminal is inserted into the IC reader/writer, the printer reads the ID number from the portable IC terminal. Further, the printer reads the biometrics data from the human body by the sensor. Thereafter, the printer stores the read ID number and the read biometrics data in the printer in association with each other. When using the printer, in a case where the combination of an ID number read from a portable IC terminal and biometrics data read from a human body is stored in the printer, an authorization to use the printer is given.

SUMMARY

In the above described technology, it is not possible to restrict combinations of ID numbers and biometrics data to be stored in the printer by the preparation process. Accordingly, aspects of the present invention provide a technology capable of restricting registration for using a specific function which can be performed by a function performing apparatus.

A function performing apparatus including: a function performing unit configured to perform a specific function; an operation unit configured to be operated by a user; a processor; and memory storing computer-readable instructions therein, the computer-readable instructions, when executed by the processor, causing the function performing apparatus to perform: receiving a first instruction for registering first authentication information from a portable device, in a case where the first instruction is received, determining, based on a registration condition designated by an administrator, whether first authentication information for the portable device is to be registered in an authentication memory, registering the first authentication information in the authentication memory when determined that the first authentication information is to be registered in the authentication memory, transmitting the first authentication information when determined that the first authentication information is to be registered in the authentication memory, receiving a second instruction including the first authentication information from the portable device, in a case where the second instruction is received while the first authentication information is registered in authentication the memory, changing a state of the function performing apparatus from a non-permission state where use of the specific function is not permitted to a permission state where the use of the specific function is permitted, and, in a case where the operation unit is operated by a user and second authentication information different from the first authentication information is input to the function performing apparatus while the second authentication information is registered in the authentication memory, changing the state of the function performing apparatus from the non-permission state to the permission state.

In the above described configuration, the function performing apparatus determines whether authentication information is to be registered in the authentication memory based on the registration condition designated by the administrator. Therefore, the administrator can restrict authentication information to be registered in the authentication memory. As a result, it is possible to appropriately restrict use of the functions of the function performing apparatus.

Control methods for implementing the above described function performing apparatus, computer programs, and computer-readable storage medium having the computer program stored thereon also are novel and useful. Also, a communication system including the above described function performing apparatus and a portable device is novel and useful.

DETAILED DESCRIPTION

Configuration of Communication System 2

Figure 1:
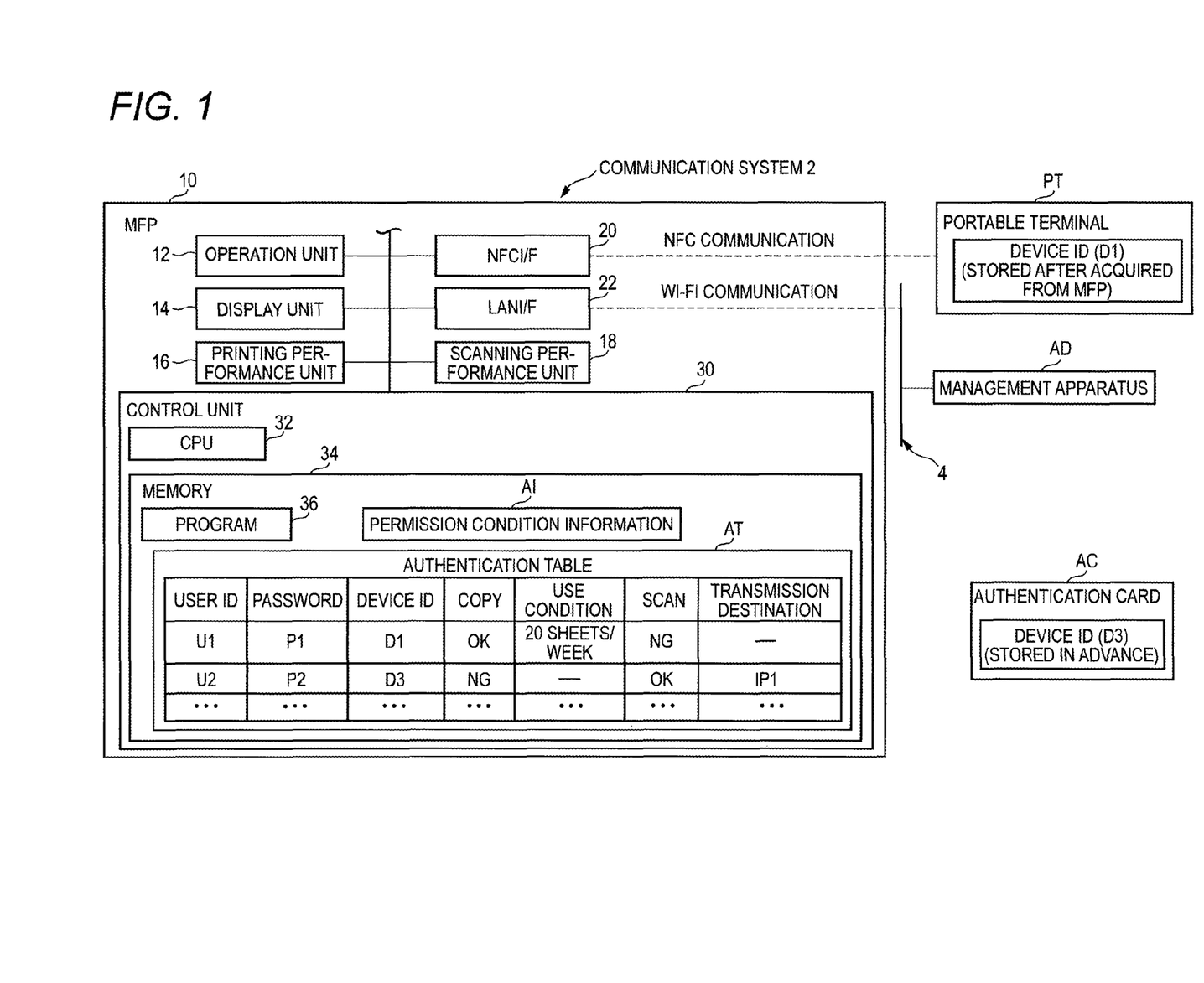
FIG. 1 is a view illustrating a configuration of a communication system.

As shown in FIG. 1, the communication system 2 includes a multi-function peripheral (MFP) 10, a management apparatus AD, a portable terminal PT, and an authentication card AC.

Configuration of MFP 10

The MFP 10 is a peripheral device capable of performing multiple functions such as a printing function, a scanning function, and a copying function (that is, a peripheral device such as a personal computer (PC) not shown). The MFP 10 includes an operation unit 12, a display unit 14, a printing performance unit 16, a scanning performance unit 18, a near field communication (NFC) interface 20, a local area network (LAN) interface 22, and a control unit 30. The individual units 12 to 30 are connected to a bus line (whose reference symbol is omitted). Hereinafter, the term "interface" will be referred to as I/F.

The operation unit 12 includes a plurality of keys. A user can operate the operation unit 12, thereby inputting a variety of instructions to the MFP 10. The display unit 14 is a display for displaying a variety of information. The printing performance unit 16 is a printing mechanism such as an inkjet type mechanism or a laser type mechanism. The scanning unit 18 is a scanning mechanism such a CCD or a CIS.

The NFC I/F 20 is an I/F for performing NFC according to an NFC method. The NFC method is a wireless communication method for performing near field communication, for example, according to the international standards of ISO/IEC 21481 or 18092. The NFC I/F 20 can operate in a peer to peer (P2P) mode, a reader/writer (R/W) mode, and a card emulation (CE) mode.

The LAN I/F 22 is an I/F for performing wireless communication according to a Wi-Fi method (that is, Wi-Fi communication). The MFP 10 is connected to a LAN 4 by use of the LAN I/F 22. However, in a modified example, the LAN I/F 22 may be an I/F for performing wired communication. The Wi-Fi method is a wireless communication method for performing wireless communication, for example, according to the standards of 802.11 of the Institute of Electrical and Electronics Engineers, Inc. (IEEE), and standards (for example, 802.11a, 802.11b, 802.11g, or 802.11n) based on the standards of 802.11.

Now, the difference between wired communication through the NFC I/F 20 and wireless communication through the LAN I/F 22 will be described. The communication rate of wireless communication through the LAN I/F 22 (the maximum communication rate is, for example, 11 Mbps to 600 Mbps) is higher than the communication rate of wireless communication through the NFC I/F 20 (the maximum communication rate is, for example, 100 Kbps to 424 Kbps). Further, the frequencies of carrier waves in wireless communication through the LAN I/F 22 (for example, a band of 2.4 GHz or 5.0 GHz) are different from the frequencies of carrier waves in wireless communication through the NFC I/F 20 (for example, a band of 13.56 MHz). Furthermore, a maximum distance (for example, at most 100 m) within which the MFP 10 can perform wireless communication with an external device through the LAN I/F 22 is longer than a maximum distance (for example, at most 10 cm) within which the MFP 10 can perform wireless communication with an external device through the NFC I/F 20.

The control unit 30 includes a CPU 32 and a memory 34. The CPU 32 performs various processes according to programs 36 stored in the memory 34. The memory 34 stores an authentication table AT and a permission condition information AI, in addition to the programs 36.

The authentication table AT can store a plurality of combination information items corresponding to a plurality of users. Each combination information item is information including a user ID, a password, a device ID, copy permission information, scan permission information, use condition information, and transmission destination information associated with one another. The user ID and the password are user authentication information for authenticating a user. The device ID is device authentication information for authenticating a device (such as the portable terminal PT or the authentication card AC) different from the MFP 10. The copy permission information is information indicating whether the user is permitted to perform the copying function, and the scan permission information is information indicating whether the user is permitted to perform the scanning function, and each of the copy permission information and the scan permission information indicates any one of values "OK" and "NG". The value "OK" indicates that the user is permitted to perform the corresponding function (the copying function or the scanning function), and the value "NG" indicates that the user is not permitted to perform the corresponding function.

The use condition information is information indicates a condition under which the user can use the copying function. For example, a case where "50 SHEETS/WEEK" has been stored in the use condition information means that the user can use the copying function up to 50 sheets every week. The transmission destination information is information indicating the transmission destination of scan data generated by performing the scanning function, and indicates the IP address of an external device such as a PC.

The permission condition information AI is information which is stored in the memory 34 by the administrator of the MFP 10. The permission condition information AI indicates a condition which is used to determine whether a combination information item is to be registered in the authentication table. The permission condition information AI includes information on which functions of the MFP 10 the user is permitted to use. For example, the permission condition information AI indicates that the user is permitted to use the copying function but is not permitted to use the scanning function. In a case where the user is permitted to use the copying function, the permission condition information further includes information indicating a condition under which the user can use the copying function (for example, information indicating that the user can use the copying function up to 50 sheets every week).

Configuration of Portable Terminal PT

The portable terminal PT is a portable device such as a portable phone (for example, a smart phone), a personal digital assistant (PDA), a laptop, a tablet PC, a portable music player, or a portable video player.

The portable terminal PT includes an NFC I/F (not shown), and can perform NFC. The portable terminal PT further includes a LAN I/F (not shown), and can perform Wi-Fi communication. Similarly to the NFC I/F 20, the NFC I/F of the portable terminal PT can operate in a P2P mode, a R/W mode, and a CE mode.

In the portable terminal PT, an application for using the MFP 10 is installed. The application is a program for using the MFP 10, and more specifically, is a program for implementing a process of registering the portable terminal PT in the MFP 10 and a process of logging in to the MFP 10 by use of the portable terminal PT. The application is provided by the vendor of the MFP 10, and may be installed in the portable terminal PT from a server on the Internet, or may be installed in the portable terminal PT from a medium shipped together with the MFP 10.

The portable terminal PT can store a device ID. The device ID is information which is acquired from the MFP 10. Therefore, before the device ID is acquired from the MFP 10, the portable terminal PT does not have any device ID stored therein, and after the device ID is acquired from the MFP 10, the portable terminal PT stores the device ID.

Configuration of Management Apparatus AD

The management apparatus AD is used by the administrator of the communication system 2. The management apparatus AD has a LAN I/F (not shown), and can perform communication with the MFP 10 through the LAN 4.

Configuration of Authentication Card AC

The authentication card AC is a portable card which is given from the vendor of the MFP 10 to the administrator of the communication system 2. The administrator of the communication system 2 can give the authentication card AC to the user. Accordingly, the user can use the authentication card AC to log in to the MFP 10.

The authentication card AC has an NFC I/F (not shown), and can perform NFC. The NFC I/F of the authentication card AC is an I/F acting as an NFC standard card. An NFC standard card can perform the same operation as that of the CE mode described above, but cannot perform the operations of the P2P mode and the R/W mode.

Also, the authentication card AC includes a memory (not shown), and the corresponding memory stores a device ID "D3", which is a combination of a plurality of alphabets and/or numeric characters, in advance. The device ID "D3" of the authentication card AC has a predetermined number of characters.

Figure 2:
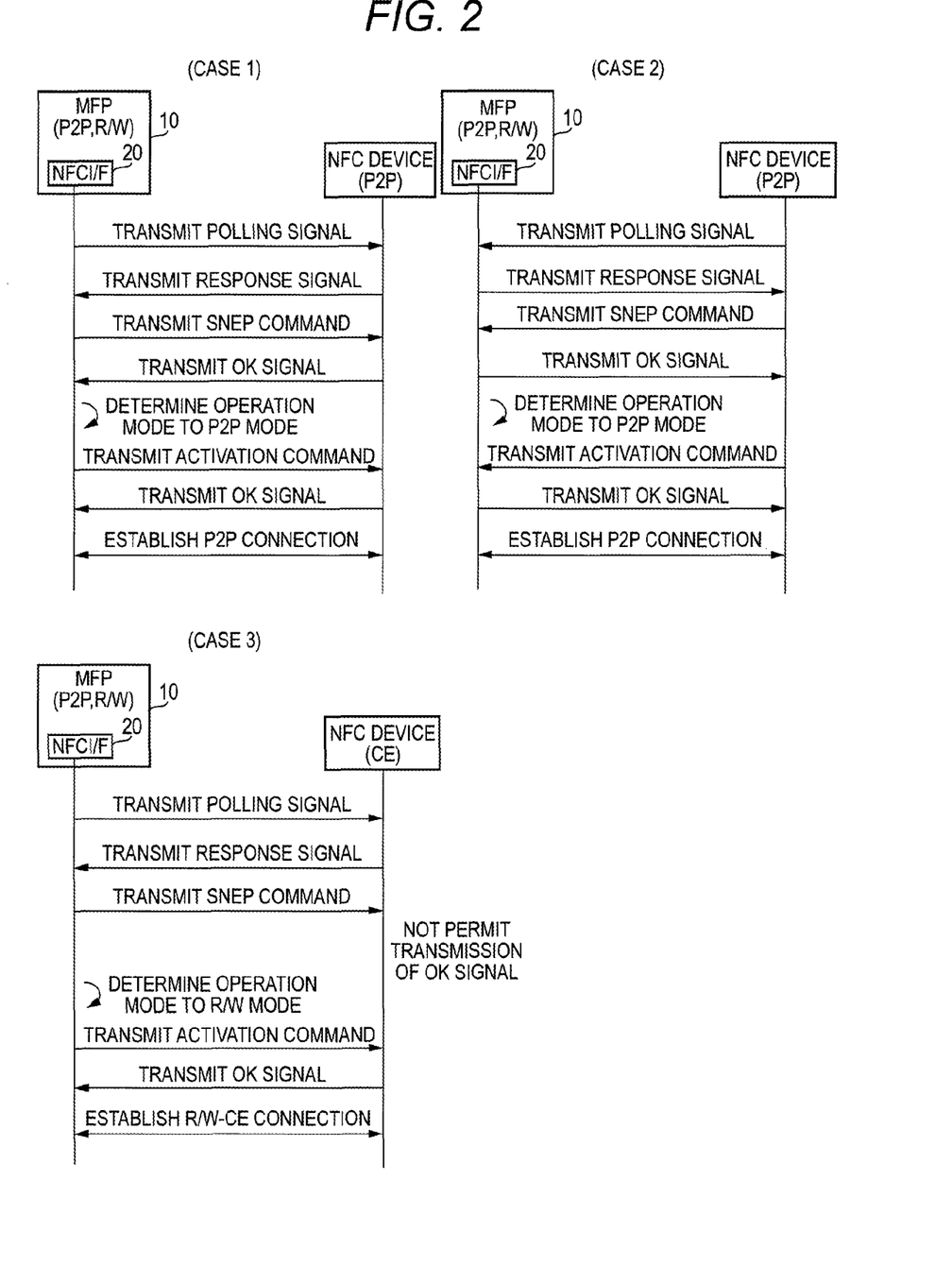
FIG. 2 is a view illustrating a manner in which an NFC connection is established between an MFP and an NFC device.

NFC Connection; FIG. 2

Subsequently, with reference to FIG. 2, an NFC connection which is established between the NFC I/F 20 of the MFP 10 and the NFC I/F of an NFC device will be described. The NFC device of FIG. 2 is a device capable of establishing an NFC connection with the MFP 10, and is, for example, the portable terminal PT or the authentication card AC.

Case 1

CASE 1 represents a case where the NFC I/F 20 of the MFP 10 operates in the P2P mode and the R/W mode, and the NFC I/F of the NFC device operates only in the P2P mode. The NFC I/F 20 of the MFP 10 repeatedly performs a set of sequential operations of a Poll operation and a Listen operation. Also, the NFC device which operates only in the P2P mode repeatedly performs one set of operations described above.

A Poll operation is an operation of transmitting a polling signal and monitoring reception of a response signal. A Listen operation is an operation of monitoring reception of a polling signal, and transmitting a response signal if a polling signal is received. In CASE 1, a period during which the NFC I/F 20 of the MFP 10 performs a Poll operation and a period during which the NFC I/F of the NFC device performs a Listen operation coincide with each other. As a result, the MFP 10 transmits a polling signal to the NFC device, and receives a response signal from the NFC device.

In a case where a response signal is received from the NFC device, the MFP 10 transmits a SNEP (the abbreviation for Simple NDEF Exchange Protocol) command for checking whether the NFC device is operating in the P2P mode, to the NFC device. Here, NDEF is the abbreviation for NFC Data Exchange Format.

Since the NFC device is operating in the P2P mode, in a case where the SNEP command is received from the MFP 10, the NFC device transmits an OK signal to the MFP 10.

In a case where the OK signal is received from the NFC device, the MFP 10 determines that a connection for operating in the P2P mode among the P2P mode and the R/W mode is to be established. Then, the MFP 10 transmits an activation command to the NFC device. The activation command is a command which is transmitted from the apparatus having performed the Poll operation to the device having performed the Listen operation. Next, the MFP 10 receives an OK signal from the NFC device. As a result, between the NFC I/F 20 of the MFP 10 and the NFC I/F of the NFC device, a P2P connection is established such that both NFC I/Fs operate in the P2P mode.

The MFP 10 and the NFC device can use the P2P connection to perform bidirectional communication of a variety of data.

Case 2

Similarly to CASE 1, also in CASE 2, the NFC I/F 20 of the MFP 10 operates in the P2P mode and the R/W mode, and the NFC I/F of the NFC device operates only in the P2P mode. In CASE 2, a period during which the NFC I/F 20 of the MFP 10 performs a Listen operation, and a period during which the NFC I/F of the NFC device performs a Poll operation coincide with each other. As a result, the MFP 10 receives a polling signal from the NFC device, and transmits a response signal to the NFC device.

Thereafter, the MFP 10 receives an SNEP command from the NFC device. As a result, the MFP 10 can recognize that the NFC device is operating in the P2P mode, and thus transmits an OK signal to the NFC device. Then, the MFP 10 determines that a connection for operating in the P2P mode among the P2P mode and the R/W mode is to be established. The MFP 10 receives an activation command from the NFC device, and transmits an OK signal to the NFC device. As a result, between the NFC I/F 20 of the MFP 10 and the NFC I/F of the NFC device, a P2P connection is established.

Case 3

CASE 3 represents a case where the NFC I/F 20 of the MFP 10 operates in the P2P mode and the R/W mode described above, and the NFC I/F of the NFC device operates only in the CE mode. The NFC device operating only in the CE mode performs only a Listen operation, without performing a Poll operation. Therefore, the MFP 10 transmits a polling signal to the NFC device, and receives a response signal from the NFC device.

In a case where the response signal is received from the NFC device, the MFP 10 transmits an SNEP command to the NFC device. Since the NFC device is not operating in the P2P mode (that is, since the NFC device is operating only in the CE mode), even if the SNEP command is received from the MFP 10, the NFC device does not transmit an OK signal to the MFP 10.

In a case where any OK signal is not received from the NFC device, the MFP 10 determines that a connection for operating in the R/W mode among the P2P mode and the R/W mode is to be established. Then, the MFP 10 transmits an activation command to the NFC device, and receives an OK signal from the NFC device. As a result, between the NFC I/F 20 of the MFP 10 and the NFC I/F of the NFC device, a R/W-CE connection is established. The R/W-CE connection is a connection in which the NFC I/F 20 of the MFP 10 operates in the R/W mode, and the NFC I/F of the NFC device operates in the CE mode.

For example, in a case where the NFC I/F 20 of the MFP 10 operates as a reader of the R/W mode, the MFP 10 can use the R/W-CE connection to read data from the NFC device (that is, to receive data). Also, for example, in a case where the NFC I/F 20 of the MFP 10 operates as a writer of the R/W mode, the MFP 10 can use the R/W-CE connection to write data in the NFC device (that is, to transmit data).

As shown in CASE 1 to CASE 3 described above, the MFP 10 can determine which of the P2P connection or the R/W-CE connection is to be established, according to the operation of the NFC device serving as a communication partner.

Figure 3:
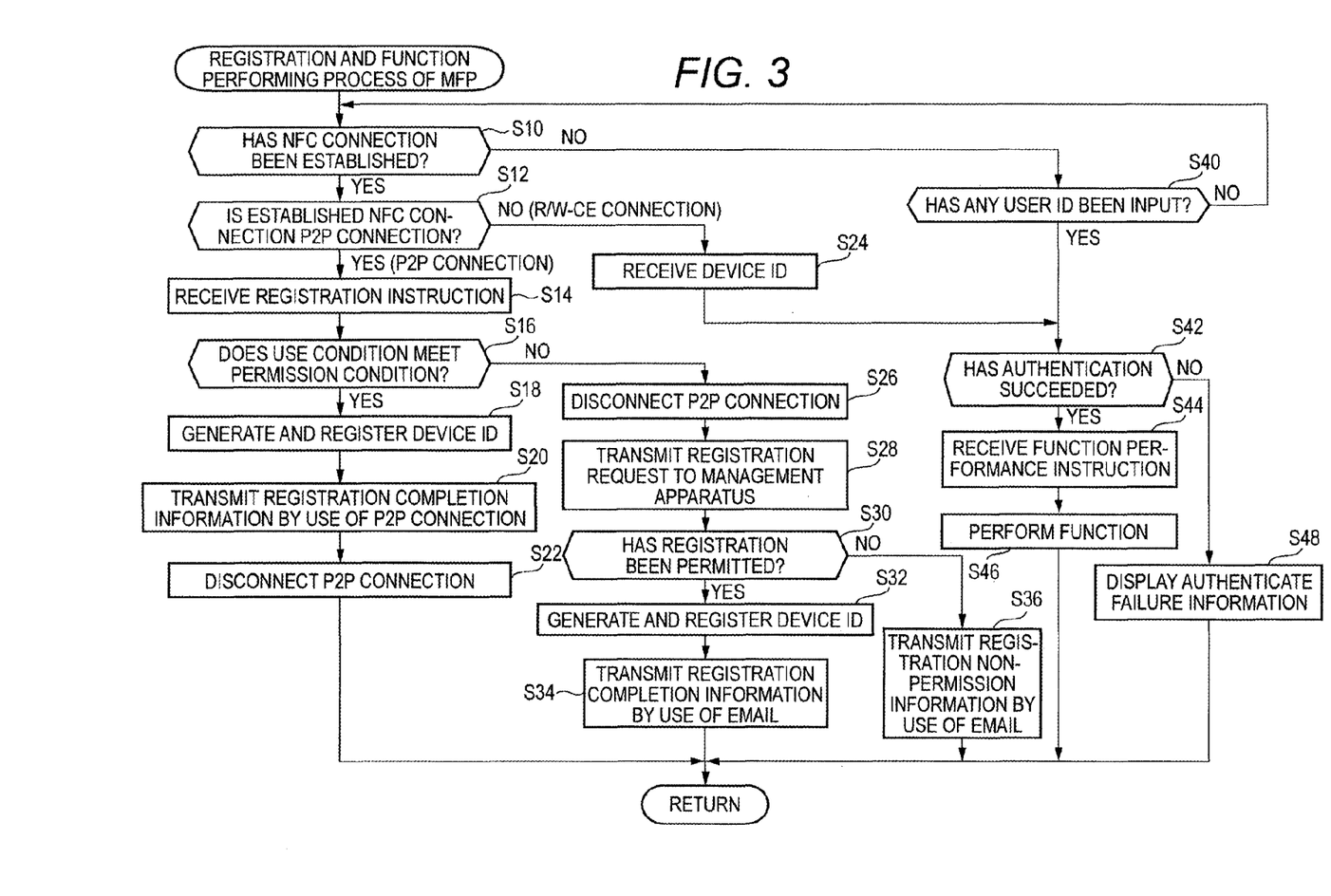
FIG. 3 is a flow chart illustrating a registration and function performing process of the MFP.

Registration and Function Performing Process of MFP 10; FIG. 3

Subsequently, with reference to FIG. 3, a registration and function performing process which is performed by the CPU 32 of the MFP 10 will be described. If the MFP 10 is powered on, the CPU 32 starts the registration and function performing process.

In STEP S10, the CPU 32 monitors establishment of an NFC connection through the NFC I/F 20. In a case where an OK signal in response to an activation command is received from the NFC device (CASE 1 or CASE 3 of FIG. 2), or in a case where an OK signal in response to an activation command is transmitted to the NFC device (CASE 2 of FIG. 2), the CPU 32 determines "YES" in STEP S10, and then proceeds to STEP S12. Hereinafter, the NFC device having established an NFC connection with the MFP 10 will be referred to as a target device.

In STEP S12, the CPU 32 determines whether the established NFC connection is a P2P connection or a R/W-CE connection. In a case where it has been determined in the course of establishing the NFC connection that the P2P connection is to be established (that is, CASE 1 or CASE 2 of FIG. 2), the CPU 32 determines that the established NFC connection is a P2P connection ("YES" in STEP S12), and then proceeds to STEP S14.

In STEP S14, the CPU 32 receives a registration instruction for instructing registration of a combination information item in the authentication table AT, from the target device, through the NFC I/F 20 (that is, by use of the P2P connection). The registration instruction includes a user ID (for example, "U1"), a password (for example, "P1"), use condition information, and an email address. The use condition information indicates a use condition under which the user of the target device can use a corresponding function (for example, the copying function or the scanning function) of the MFP 10. For example, the use condition indicates that the user can use the copying function with respect to 50 sheets of copy paper every week. The email address included in the registration instruction may be an email address at which the user of the target device can use the target device to receive emails, or may be an email address at which the user of the target device can use a device other than the target device to receive emails.

Next, in STEP S16, the CPU 32 determines whether a use condition indicated by the use condition information received in STEP S14 meets a permission condition indicated by the permission condition information AI stored in the memory 34. For example, in a case where the permission condition indicates that the user is permitted to use the copying function, and the use condition indicates that the user will use the copying function, the CPU 32 determines that the use condition meets the permission condition. That is, in a case where the use condition and the permission condition match with each other, the CPU 32 determines that the use condition meets the permission condition.

Also, for example, in a case where the permission condition indicates that the user is permitted to use the copying function, and the use condition indicates that the user will not use the copying function, the CPU 32 determines that the use condition is meets the permission condition. That is, in a case where the use condition restricts use of a corresponding function as compared to the permission condition, the CPU 32 determines that the use condition meets the permission condition.

Meanwhile, for example, in a case where the permission condition indicates that the user is not permitted to use the scanning function, and the use condition indicates that the user will use the scanning function, the CPU 32 determines that the use condition does not meet the permission condition. That is, in a case where the permission condition restricts use of a corresponding function as compared to the use condition, the CPU 32 determines that the use condition does not meet the permission condition.

In a case where it is determined that the use condition meets the permission condition ("YES" in STEP S16), in STEP S18, the CPU 32 newly generates a device ID. Specifically, the CPU 32 randomly selects alphabets and/or numeric characters, thereby generating a device ID having the predetermined number of characters. The corresponding number of characters is the same as the number of characters of the device ID "D3" (see FIG. 1) of the authentication card AC. In a case where the generated device ID matches with any one device ID having been registered at that moment in the authentication table AT, the CPU 32 regenerates a device ID. Therefore, the CPU 32 can generate a unique device ID having not been registered at that moment in the authentication table AT. Also, the CPU 32 can assign the generated device ID to the target device. As described above, the CPU 32 assigns the device ID having the same number of characters as the number of characters of the device ID "D3" of the authentication card AC, to the target device. Therefore, the CPU 32 can make the target device (for example, the portable terminal PT) to function as an authentication card by assigning a device ID to the target device. Thereafter, the CPU 32 registers a combination information item, which includes the user ID and the like included in the registration instruction received in STEP S14, and the generated device ID, in the authentication table AT.

Next, in STEP S20, the CPU 32 transmits information including the generated device ID and indicating registration completion to the target device through the NFC I/F 20 (that is, by use of the P2P connection). Next, in STEP S22, the CPU 32 disconnects the P2P connection with the target device. Specifically, the CPU 32 transmits a deactivation command for disconnecting the communication link, to the target device through the NFC I/F 20, and receives an OK command, thereby disconnecting the communication link. Also, the above described disconnection method is a general disconnection method defined by NFC Forum.

Also, in a modified example, the CPU 32 may stop the operation of the NFC I/F 20 for a predetermined standby period (for example, 200 ms), thereby disconnecting the communication link. More specifically, for example, the CPU 32 may transmit a stop instruction for stopping the operation of the NFC I/F 20, to the NFC I/F 20. As a result, the NFC I/F 20 temporarily stops all operations including reception of a signal from the external, transmission of a signal to the external, a Poll operation (to be described below), and a Listen operation (to be described below). After the predetermined standby period elapses, the CPU 32 may transmit a restart instruction for restarting the operation of the NFC I/F 20, to the NFC I/F 20. Thereby, the NFC I/F 20 restarts the operation. As a result, the NFC I/F 20 having restarted the operation returns to a state where it can perform a Poll operation and a Listen operation (to be described below). If the process of STEP S22 finishes, the CPU 32 returns to the process of STEP S10.

Meanwhile, in a case where it is determined that the use condition does not meet the permission condition ("NO" in STEP S16), in STEP S26, the CPU 32 disconnects the P2P connection with the target device by use of the same disconnection method as that of STEP S22. Next, in STEP S28, the CPU 32 transmits a registration request for registering a combination information item, which corresponds to the registration instruction received in STEP S14, in the authentication table AT, to the management apparatus AD through the LAN I/F 22 (that is, through the LAN 4). The registration request is a command for requesting registration of the user ID and the like received in STEP S14 in the authentication table AT. The registration request includes the user ID and the use condition information included in the registration instruction. Next, in STEP S30, the CPU 32 receives the result of the registration request from the management apparatus AD through the LAN I/F 22. Then, in a case where the received registration request result indicates registration non-permission, the CPU 32 determines that the combination information item is to not be registered ("NO" in STEP S30). In the case of "NO" in STEP S30, in STEP S36, the CPU 32 designates the email address received in STEP S14, as a transmission destination, and transmits an email including information indicating that registration has not been permitted, through the LAN I/F 22 (that is, by use of Wi-Fi communication), and then returns to STEP S10.

Meanwhile, in a case where the received registration request result indicates registration permission, the CPU 32 determines that the combination information item is to be registered ("YES" in STEP S30). In the case of "YES" in STEP S30, in STEP S32, the CPU 32 generates a device ID by the same method as that of STEP S18. Subsequently, similarly in STEP S18, the CPU 32 registers the combination information item, which includes the user ID and the like included in the registration instruction received in STEP S14, and the generated device ID, in the authentication table AT. Next, in STEP S34, the CPU 32 designates the email address received in STEP S14, as a transmission destination, and transmits an email including information indicating registration completion and the device ID, and then returns to STEP S10.

In a case where it has been determined in STEP S12 that, in the course of establishing the NFC connection, a R/W-CE connection is to be established (that is, CASE 3 of FIG. 2), the CPU 32 determines that the established NFC connection is a R/W-CE connection ("NO" in STEP S12), and then proceeds to STEP S24. In STEP S24, the CPU 32 receives a device ID from the target device through the NFC I/F 20 (by use of the R/W-CE connection). Hereinafter, the device ID received in STEP S24 will be referred to as a target device ID. According to this configuration, based on whether the connection between the MFP 10 and the target device is a P2P connection or a R/W-CE connection, the MFP 10 can recognize which of a registration instruction and a device ID will be received from the target device.

Meanwhile, in STEP S10, in a case where an OK signal to the activation command is not received from the NFC device and an OK signal to the activation command is not transmitted to the NFC device, the CPU 32 determines "NO", and then proceeds to STEP S40. In STEP S40, the CPU 32 monitors whether an operation for inputting a user ID and a password is performed to the operation unit 12. In a case where the operation is performed, the CPU 32 determines "YES" in STEP S40, and then proceeds to STEP S42. Meanwhile, in a case where the operation is not performed, the CPU 32 determines "NO" in STEP S40, and then returns to STEP S10. Hereinafter, the user ID input in STEP S40 will be referred to as a target user ID, and the set of the user ID and the password input in STEP S10 will be referred to as a target set.

Next, in STEP S42, the CPU 32 performs authentication, and determines whether the corresponding authentication has succeeded. After the target device ID has been received in STEP S24, if it is determined in STEP S42 that the target device ID is not registered in the authentication table AT (that is, the authentication has been failed) ("NO" in STEP S42), the CPU 32 proceeds to STEP S48, and if it is determined that the target device ID is registered in the authentication table AT (that is, the authentication has succeeded) ("YES" in STEP S42), the CPU 32 proceeds to STEP S44.

Meanwhile, after the target set has been input in STEP S40, if it is determined in STEP S42 that the target is not registered in the authentication table AT (that is, the authentication has been failed) ("NO" in STEP S42), the CPU 32 proceeds to STEP S48, and if it is determined that the target set is registered in the authentication table AT (that is, the authentication has succeeded) ("YES" in STEP S42), the CPU 32 proceeds to STEP S44.

If authentication succeeds in STEP S42 ("YES" in STEP S42), the CPU 32 changes the state of the MFP 10 from a logoff state to a login state corresponding to the target user ID or the target device ID. The logoff state is a state where each user is not permitted to perform at least one of the copying function and the scanning function. Also, the login state corresponding to the target user ID or the target device ID is a state where if at least one of the copy permission information and the scan permission information associated with the target user ID indicates "OK", the target user is permitted to perform the at least one of the copying function and the scanning function.

In STEP S44, the CPU 32 monitors whether an operation for instructing performance of the copying function or the scanning function (hereinafter, referred to as a function performance operation) is performed to the operation unit 12. Specifically, the CPU 32 first acquires the copy permission information, the scan permission information, and the use condition information associated with the target device ID or the target set, from the authentication table AT. Thereafter, the CPU 32 performs control such that the display unit 14 displays a screen representing the copy permission information, the scan permission information, and the use condition information having been acquired. Therefore, the user can see functions which the user can use.

Next, in STEP S46, if a function performance operation is performed, the CPU 32 performs the function designated in STEP S44. For example, in a case where the designated function is the copying function, the CPU 32 performs control such that the scanning performance unit 18 scans documents. Next, the CPU 32 supplies the scan data to the printing performance unit 16. Therefore, the printing performance unit 16 prints images indicated by the scan data, on print media. Also, for example, in a case where the designated function is the scanning function, the CPU 32 performs control such that the scanning performance unit 18 scans documents. Next, the CPU 32 acquires transmission destination information (for example, "IP1") associated with the target user ID, from the authentication table AT. Thereafter, the CPU 32 transmits the scan data through the LAN I/F 22 by use of the acquired transmission destination information. If STEP S46 finishes, the CPU 32 returns to STEP S10.

Meanwhile, in STEP S48, the CPU 32 performs control such that the display unit 14 displays an error message indicating authentication failure. If STEP S48 finishes, the CPU 32 returns to STEP S10.

Figure 4:
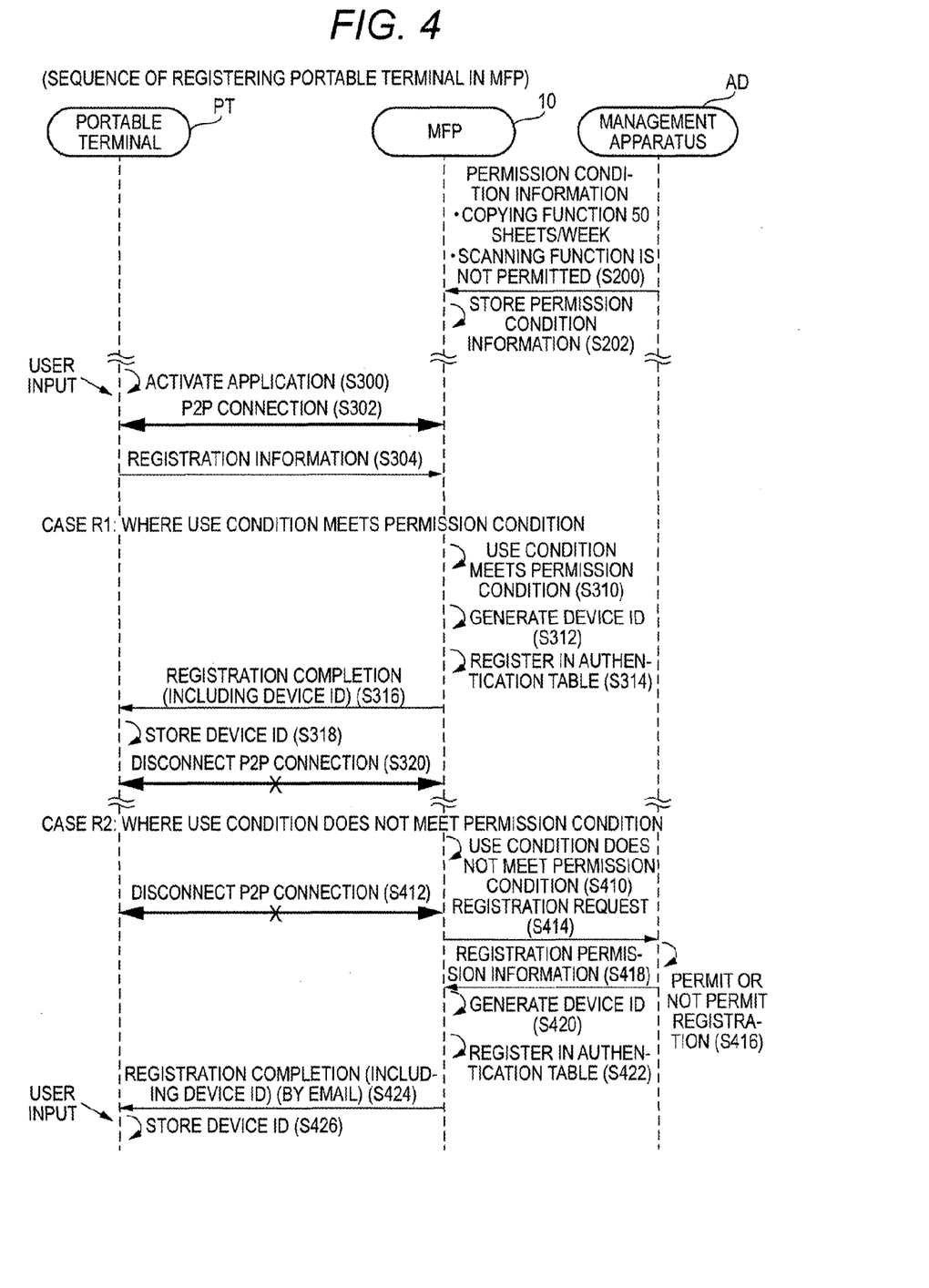
FIG. 4 is a sequence diagram illustrating a portable terminal registering process which is performed by the MFP, a portable terminal, and a management apparatus.

Sequence of Registering Portable Terminal PT; FIG. 4

Subsequently, a specific case which is implemented according to the flow chart of FIG. 3 will be described. First, with reference to FIG. 4, a case of registering the portable terminal PT in the MFP 10 will be described.

In the initial state of FIG. 4, the MFP 10 is connected to the management apparatus AD through the LAN 4 (that is, by use of the LAN I/F 22), but is not connected to the portable terminal PT. Also, in the authentication table AT of the MFP 10, no combination information item is registered.

In STEP S200, if the administrator operates the operation unit of the management apparatus AD, thereby inputting a permission condition to the management apparatus AD, the management apparatus AD transmits permission condition information indicating the input permission condition, to the MFP 10. The permission condition indicates that the user is permitted to use the copying function but is not permitted to use the scanning function. Further, the permission condition indicates that a use limit to which the user can use the copying function is up to 50 sheets every week.

In STEP S202, the MFP 10 receives the permission condition information from the management apparatus AD through the LAN 4, and stores the received permission condition information in the memory 34.

In STEP S300, the user of the portable terminal PT operates the operation unit of the portable terminal PT, thereby activating the application installed in the portable terminal PT. In this way, the portable terminal PT determines whether any device ID is stored in the portable terminal PT. Since the portable terminal PT has not yet received any device ID from the MFP 10, no device ID is stored in the portable terminal PT. Therefore, the portable terminal PT performs control such that the display unit of the portable terminal PT displays a screen for inputting a user ID, a password, an email address, and a use condition.

The user operates the operation unit of the portable terminal PT, thereby inputting a user ID "U1", a password "P1", and an email address determined by the user, to the portable terminal PT. The user further operates the operation unit of the portable terminal PT, thereby inputting a use condition indicating a function of the MFP 10 which the user desires to use. For example, the user inputs a use condition indicating that the user will use the copying function but will not use the scanning function. Further, for example, the use condition indicating that the use limit of the copying function is up to 20 sheets every week. Hereinafter, the user ID, the password, and the email address having been input, and use condition information indicating the input use condition will be referred to collectively as registration information.

In STEP S300, since no device ID is stored, the portable terminal PT operates the NFC I/F of the portable terminal PT in the P2P mode.

In STEP S302, due to the user bringing the portable terminal PT close to the MFP 10, a P2P connection is established between the MFP 10 and the portable terminal PT ("YES" in STEP S12 of FIG. 3). In STEP S304, the portable terminal PT transmits the registration information to the MFP 10 by use of the P2P connection.

If the registration information is received, the MFP 10 acquires the use condition information included in the registration information. Also, the MFP 10 acquires the permission condition information AI stored in the memory 34. Thereafter, the MFP 10 determines whether the use condition indicated by the acquired use condition information meets the permission condition indicated by the permission condition information AI (STEP S16 of FIG. 3). Subsequent processes which will be performed by the MFP 10, the portable terminal PT, and the management apparatus AD differs depending on the result of the determination on whether the use condition meets the permission condition. Hereinafter, CASE R1 where the use condition meets the permission condition, and CASE R2 where the use condition does not meet the permission condition will be sequentially described.

Case R1; Where Use Condition Meets Permission Condition ("Yes" in Step S16 of FIG. 3)

In STEP S310, the MFP 10 determines that the use condition meets the permission condition. For example, a case where the permission condition indicates that "the user is permitted to use the copying function", "the number of sheets allowed to be copied is 50 every week", and "the user is not permitted to use the scanning function", and the use condition indicates that "the user is permitted to use the copying function", "the number of sheets allowed to be copied is 20 every week", and "the user is not permitted to use the scanning function" will be described. The use condition is the same as the permission condition in that "the user is permitted to use the copying function", and "the user is not permitted to use the scanning function". Further, the use condition indicating that "the number of sheets allowed to be copied is 20 every week" restricts use of the copying function as compared to the permission condition indicating that "the number of sheets allowed to be copied is 50 every week". Therefore, the MFP 10 determines that the use condition meets the permission condition.

In STEP S312, the MFP 10 generates a device ID "D1" (STEP S18 of FIG. 3). Next, in STEP S314, the MFP 10 registers a combination information item including the device ID "D1", and the user ID "U1", the password "P1", the use condition information included in the registration information, in the authentication table AT (STEP S18 of FIG. 3). In STEP S316, the MFP 10 transmits information indicating registration completion to the portable terminal PT by use of the P2P connection. Also, the information indicating registration completion includes the device ID "D1" (STEP S20 of FIG. 3).

In STEP S318, if the device ID "D1" is received from the MFP 10, the portable terminal PT stores the device ID in the portable terminal PT.

In STEP S320, the MFP 10 disconnects the P2P connection with the portable terminal PT (STEP S22 of FIG. 3).

Case R2; Where Use Condition Does Not Meet Permission Condition ("No" in Step S16 of FIG. 3)

In STEP S410, the MFP 10 determines that the use condition does not meet the permission condition. For example, a case where the permission condition indicates that "the user is permitted to use the copying function", "the number of sheets allowed to be copied is 50 every week", and "the user is not permitted to use the scanning function", and the use condition indicates that "the user is permitted to use the copying function", "the number of sheets allowed to be copied is 100 every week", and "the user is permitted to use the scanning function" will be described. The permission condition indicating that "the user is permitted to use the copying function", and "the user is not permitted to use the scanning function" does not match with the use condition indicating that "the user is permitted to use the copying function", and "the user is permitted to use the scanning function". Therefore, the MFP 10 determines that the use condition does not meet the permission condition. Meanwhile, the permission condition indicating that "the number of sheets allowed to be copied is 50 every week" restricts use of the copying function as compared to the use condition indicating that "the number of sheets allowed to be copied is 100 every week". For this reason, the MFP 10 may also determine that the use condition does not meet the permission condition.

In STEP S412, the MFP 10 disconnects the P2P connection with the portable terminal PT (STEP S26 of FIG. 3). Next, in STEP S414, the MFP 10 transmits a registration request including the use condition information and the user ID included in the registration information, to the management apparatus AD through the LAN 4 (STEP S28 of FIG. 3).

If the registration request is received, the management apparatus AD acquires the use condition information and the user ID included in the registration request. Next, the management apparatus AD performs control such that the display unit of the management apparatus AD displays the acquired user ID and the use condition indicated by the acquired use condition information. The administrator checks the display unit of the management apparatus AD. In STEP S416, the administrator performs an operation indicating the result of determination on whether to permit registration to the operation unit. In STEP S418, if the administrator performs an operation indicating registration permission to the operation unit, the management apparatus AD transmits information indicating registration permission according to the operation indicating the determination result to the MFP 10 through the LAN 4.

Also, in a case where the administrator performs an operation indicating registration non-permission, on the operation unit, the management apparatus AD transmits information indicating registration non-permission according to the information indicating the determination result to the MFP 10 through the LAN 4.

In STEP S420, if the information indicating registration permission is received ("YES" in STEP S30 of FIG. 3), the MFP 10 generates the device ID "D1". Next, in STEP S422, the MFP 10 registers a combination information item including the device ID "D1", and the user ID "U1", the password "P1", the use condition information included in the registration information, in the authentication table AT (STEP S32 of FIG. 3). In STEP S424, the MFP 10 designates the email address included in the registration information, as a transmission destination, and transmits an email including information indicating registration completion (STEP S34 of FIG. 3). The email includes the device ID "D1" generated in STEP S420.

If the portable terminal PT receives the email from the MFP 10, the user operates the operation unit of the portable terminal PT such that the display unit of the portable terminal PT displays the received email. Then, the user operates the operation unit of the portable terminal PT, thereby activating the application and inputting the device ID "D1" described in the email. In STEP S426, the portable terminal PT stores the input device ID "D1" in the portable terminal PT.

Also, although not shown, the user can operate the operation unit 12 of the MFP 10, thereby issuing a registration instruction. For example, if the user brings the authentication card AC close to the MFP 10, a R/W-CE connection is established between the MFP 10 and the portable terminal PT. If the MFP 10 receives the device ID "D3" of the authentication card AC by use of the R/W-CE connection, the MFP 10 determines whether the same device ID as the received device ID "D3" is registered in the authentication table AT.

If it is determined that the same device ID as the received device ID "D3" is not registered in the authentication table AT, the MFP 10 performs control such that the display unit 14 displays a screen for inputting a user ID, a password, and a use condition. Then, the user can operate the operation unit 12, thereby inputting a user ID "U2", a password "P2", and a use condition.

If the user ID "U2", the password "P2", and the use condition are input, in a case where the use condition meets the permission condition, the MFP 10 registers the device ID "D3" of the authentication card AC, and the user ID "U2", the password "P2", and the use condition having been input, in the authentication table AT. Meanwhile, in a case where the use condition does not meet the permission condition, the MFP 10 and the management apparatus AD perform the same processes as STEPS S414 to S418 of FIG. 4 (that is, STEPS S28 and S30 of FIG. 3), thereby registering the device ID "D3" of the authentication card AC, and the user ID "U2", the password "P2", and the use condition having been input, in the authentication table AT. In this way, the device ID of the authentication card AC is registered in the authentication table AT.

Effects in Registering Process

As described above, based on the permission condition designated by the administrator, the MFP 10 determines whether to register the user ID and the like having been received, in the authentication table AT. That is, in a case where the use condition meets the permission condition (STEP S310), in STEP S312, the MFP 10 registers the user ID and the like in the authentication table AT (CASE R1). According to this configuration, the administrator can restrict user IDs and the like to be registered in the authentication table AT. As a result, it is possible to prevent the MFP 10 from being used without any restriction.

Also, in a case where the use condition does not meet the permission condition (STEP S410), in STEP S414, the MFP 10 transmits the use condition information to the management apparatus AD. According to this configuration, the administrator can instruct whether to permit registration of the user ID and the like in the authentication table AT, by use of the management apparatus AD, without intentionally going to the place where the MFP 10 has been installed. Also, according to this configuration, even in a case where the use condition does not meet the permission condition, the administrator can permit registration of the user ID and the like in the authentication table AT.

In CASE R2, in STEP S414, the MFP 10 transmits the registration request to the management apparatus AD. Since the administrator determines whether to permit registration by use of the management apparatus AD, it may take a long time for the MFP 10 to be able to determine whether registration is to be performed. For this reason, in CASE R2, in STEP S412, the MFP 10 disconnects the P2P communication with the portable terminal PT. Then, in a case where it is determined that registration is to be performed (STEP S418), in STEP S422, the MFP 10 transmits the device ID by email. Therefore, even if the user of the portable terminal PT moves the portable terminal PT away from the MFP 10, the user can appropriately know the device ID.

Meanwhile, in CASE R1, in STEP S310, the MFP 10 determines that the registration is to be performed, without transmitting the registration request to the management apparatus AD. Therefore, a period from when the MFP 10 receives the registration information to when the MFP 10 transmits information indicating registration completion becomes short. Therefore, the MFP 10 can transmit the device ID to the portable terminal PT by use of the P2P connection with the portable terminal PT. According to this configuration, if it is determined that registration is to be performed, it is possible to appropriately select an interface for transmitting the device ID.

Figure 5:
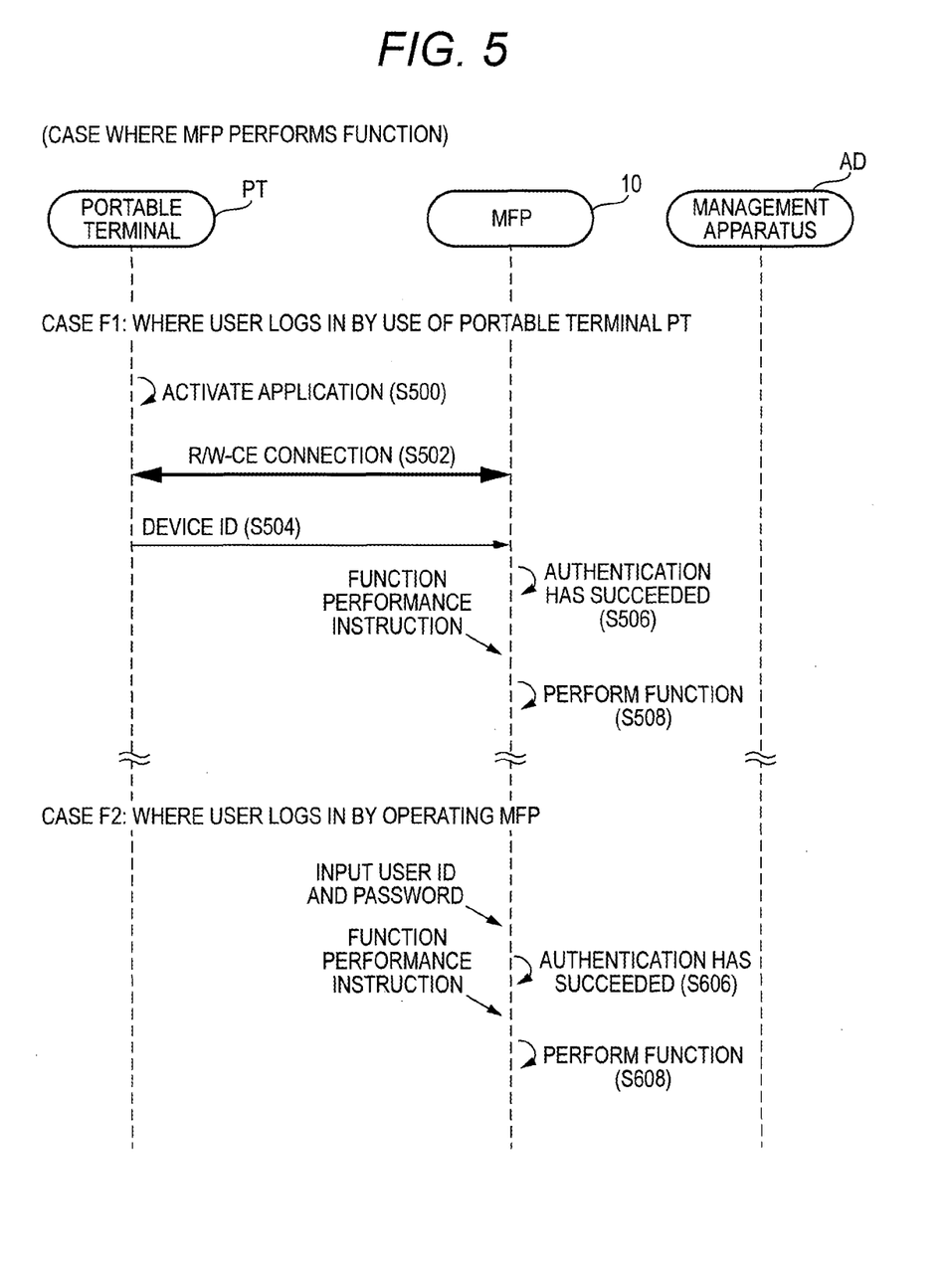
FIG. 5 is a sequence diagram illustrating a process which is for the MFP to perform a function and is performed by the MFP, the portable terminal, and the management apparatus.

Sequence in Which MFP 10 Performs Function; FIG. 5

Subsequently, with reference to FIG. 5, a sequence in which the MFP 10 performs a function will be described. In the initial state of FIG. 5, the MFP 10 is connected to the management apparatus AD through the LAN 4, whereas it may or may not be connected to the portable terminal PT. Also, in the authentication table AT of the MFP 10, a combination information item including the device ID of the portable terminal PT is registered.

As apparent from STEPS S24 and S40 of FIG. 3, in order to use a function of the MFP 10, the user needs to log in to the MFP 10 either by using the portable terminal PT, the authentication card AC, or the like (CASE F1), or by inputting a user ID and a password to the operation unit 12 of the MFP 10 (CASE F2).

Case F1; Where User Logs in by Use of Portable Terminal PT

In CASE F1, first, in STEP S500, the user of the portable terminal PT operates the operation unit of the portable terminal PT, thereby activating the application installed in the portable terminal PT. In this way, the portable terminal PT determines whether any device ID is stored in the portable terminal PT. In a case where a device ID is stored, the portable terminal PT operates the NFC I/F of the portable terminal PT in the CE mode.

In STEP S502, if the user brings the portable terminal PT close to the MFP 10, a R/W-CE connection is established between the MFP 10 and the portable terminal PT ("NO" in STEP S12 of FIG. 3). In STEP S504, the MFP 10 receives the device ID "D3" stored in the portable terminal PT, by use of the R/W-CE connection.

In STEP S506, if the device ID "D3" is received from the portable terminal PT (STEP S24 of FIG. 3), the MFP 10 determines that the received device ID "D3" is registered in the authentication table AT, and determines authentication success ("YES" in STEP S42 of FIG. 3). Thereafter, if a function performance instruction is received from the user (STEP S44 of FIG. 3), in STEP S508, the MFP 10 performs the instructed function.

According to this configuration, since the portable terminal PT operates the NFC I/F of the portable terminal PT in the CE mode, similarly to the authentication card AC, the portable terminal PT can establish a R/W-CE connection with the MFP 10. Therefore, the user can use the portable terminal PT to log in to the MFP 10.

Case F2; Where User Logs in by Inputting User ID and the Like

In the CASE F2, first, the user operates the operation unit 12, thereby inputting the user ID "U1" and the password "P1" to the MFP 10 ("YES" in STEP S40 of FIG. 3). In STEP S606, the MFP 10 determines that the input user ID "U1" and the input password "P1" have been registered in association with each other in the authentication table AT, and thus determines authentication success ("YES" in STEP S42 of FIG. 3). Thereafter, if a function performance instruction is received from the user (STEP S44 of FIG. 3), in STEP S608, the MFP 10 performs the instructed function.

According to this configuration, even if the user does not have any NFC device such as the portable terminal PT or the authentication card AC, the user can log in to the MFP 10. According to the MFP 10, the user can log in to the MFP 10 by use of the portable terminal PT, the authentication card AC, or the like, and can also log in to the MFP 10 by inputting the user ID and the like to the MFP 10.

Correspondence Relationship

The MFP 10 and the portable terminal PT are examples of the function performing apparatus and the portable device, respectively. At least one of the copying function and the scanning function is an example of the specific function. The printing performance unit 16 and the scanning performance unit 18 are examples of a function performing unit. The authentication table AT is an example of an authentication memory (second storage unit). The NFC I/F 20 and the LAN I/F 22 are examples of a first interface and a second interface, respectively. The NFC method and the Wi-Fi method are examples of a first communication method and a second communication method, respectively. The P2P mode and the R/W mode are examples of a first mode and a second mode, respectively.

The device ID and the user ID are examples of first authentication information and second authentication information, respectively. The registration instruction and the device ID are examples of a first instruction and a second instruction, respectively. The permission condition and the registration request result are examples of a registration condition. The login state and the logoff state are examples of a permission state and a non-permission state, respectively.

Second Embodiment

As compared to the MFP 10 of the first embodiment, a MFP 10 of the present embodiment is different from the MFP 10 of the first embodiment in that the processes of STEPS S16 to S22 of FIG. 3 are not performed. That is, if a registration instruction is received from the target device through the NFC I/F 20 (that is, by use of the P2P connection) (STEP S14 of FIG. 3), the CPU 32 of the MFP 10 of the present embodiment disconnects the P2P connection in STEP S26 of FIG. 3, and transmits a registration request to the management apparatus AD in STEP S28 of FIG. 3. The other configuration of the MFP 10 of the present embodiment is the same as the configuration of the MFP 10 of the first embodiment. Also, the MFP 10 may not perform the processes of STEPS S200 and S202 of FIG. 4, that is, the process of receiving the permission condition information from the management apparatus AD and the process of storing the permission condition information in the memory 34.

Although specific examples of the present invention have been described, they are merely illustrative and do not limit the scope of claims. Examples obtained by changing or modifying the above described specific examples are also to be included within the scope of the claims. Modified examples of the above described embodiments will be listed below.

MODIFIED EXAMPLE 1

In the above described embodiments, the CPU 32 of the MFP 10 receives the permission condition information from the management apparatus AD (STEP S200 of FIG. 4), before the registration instruction is received from the portable terminal PT. However, after the registration instruction is received from the portable terminal PT, the CPU 32 may receive the permission condition information from the management apparatus AD (STEP S200 of FIG. 4). In this case, the CPU 32 may transmit a permission condition information request to the management apparatus AD. If the permission condition information request is received, the management apparatus AD may transmit the permission condition information to the MFP 10. In general, the registration condition may be received from the registration management apparatus before the first instruction is received, or may be received after the first instruction is received.

MODIFIED EXAMPLE 2

In the above described embodiments, in the case where the use condition does not meet the permission condition ("NO" in STEP S16 of FIG. 3), in STEP S28, the CPU 32 of the MFP 10 transmits the registration request to the management apparatus AD. However, in the case where the use condition does not meet the permission condition ("NO" in STEP S16 of FIG. 3), the CPU 32 may transmit information indicating that the use condition does not meet the permission condition, to the management apparatus AD. Then, the CPU 32 may receive information indicating a condition (indicating, for example, that it is possible to use the scanning function) different from the permission condition (indicating, for example, that it is not possible to use the scanning function), from the management apparatus AD. For example, if receiving the information (which may include the user ID and the like) indicating that the use condition does not meet the permission condition, the management apparatus AD may notify the received information to the administrator. The administrator may input a condition different from the permission condition for each user requiring registration. The management apparatus AD may transmit the condition input from the administrator to the MFP 10. In general, in the case where the use condition does not meet the permission condition, the information indicating that the use condition does not meet the permission condition may be transmitted to the registration management apparatus, a condition included in the registration condition and different from the permission condition may be received from the registration management apparatus, and it may be determined that the first authentication information is to be registered in the authentication memory based on the received different condition.

MODIFIED EXAMPLE 3

In the above described embodiments, in a case where the target device is to be registered ("YES" in STEP S16 of FIG. 3, or "YES" in STEP S30), in STEP S18 or S32, the CPU 32 of the MFP 10 generates a device ID. Alternatively, before it is determined that the target device is to be registered, the CPU 32 may generate a unique device ID in advance. Then, in a case where the target device is to be registered ("YES" in STEP S16 of FIG. 3, or "YES" in STEP S30), the CPU 32 may perform registration of the generated device ID. In general, the first authentication information may be generated after it is determined that the first authentication information is to be registered in the authentication memory, or may be generated before it is determined that the first authentication information is to be registered in the authentication memory.

MODIFIED EXAMPLE 4

In the above described embodiments, in the case where the target device is to be registered ("YES" in STEP S16 of FIG. 3, or "YES" in STEP S30), in STEP S18 or S32, the CPU 32 of the MFP 10 generates a device ID. Alternatively, the CPU 32 may acquire a device ID from a device (for example, the portable terminal PT) different from the MFP 10. In general, in a case where it is determined that the first authentication information is to be registered in the authentication memory, the first authentication information may be acquired from a device different from the function performing apparatus, and the acquired first authentication information may be registered in the authentication memory.

MODIFIED EXAMPLE 5

In the above described embodiments, in the case where the target device is to be registered ("YES" in STEP S16 of FIG. 3, or "YES" in STEP S30), in STEP S18 or S32, the CPU 32 of the MFP 10 generates a device ID. However, the CPU 32 may not generate any device ID. For example, in the case where the target device is to be registered ("YES" in STEP S16 of FIG. 3, or "YES" in STEP S30), the CPU 32 may register the user ID, the password, and the use condition received from the target device, in the authentication table AT, without registering any device ID in the authentication table AT. In this case, in a case of logging in to the MFP 10, the target device may transmit the user ID and the password to the MFP 10. In the present modified example, the user ID is an example of the first authentication information.

MODIFIED EXAMPLE 6

The authentication table AT may not be stored in the memory 34 of the MFP 10, and may be stored a specific device (for example, a server) configured separately from the MFP 10. In this case, for example, in a case of performing STEP S20, S34, or S42 of FIG. 3, the CPU 32 of the MFP 10 may perform communication with the specific device, and access the authentication table AT stored in the specific device. In general, the authentication memory may be located inside the function performing apparatus, or may be located outside the function performing apparatus.

MODIFIED EXAMPLE 7

In the above described embodiments, in the case where the use condition does not meet the permission condition ("NO" in STEP S16 of FIG. 3), in STEP S26, the CPU 32 of the MFP 10 disconnects the P2P connection. However, the CPU 32 may not perform the process of STEP S26 to disconnect the P2P connection. In the present modified example, for example, if the user moves the target device away from the MFP 10, the P2P connection may be disconnected. In the present modified example, when information indicating registration completion is to be transmitted, and when information indicating registration non-permission is to be transmitted, the CPU 32 may determine whether the P2P communication has been maintained. In a case where it is determined that the P2P communication is maintained, the CPU 32 may transmit the information indicating registration completion, or the information indicating registration non-permission, by use of the P2P connection. Meanwhile, in a case where it is determined that the P2P communication is not maintained, the CPU 32 may transmit the information indicating registration completion, or the information indicating registration non-permission by email. In general, if the request result indicates that registration of the first authentication information is permitted, it may be determined that the first authentication information is to be registered in the authentication memory. In this case, it may be determined whether it is possible to perform communication with the portable device through the first interface. If it is determined that it is possible to perform communication with the portable device through the first interface, the first authentication information may be transmitted to the portable device by performing communication using the first interface. Meanwhile, if it is determined that it is not possible to perform communication with the portable device through the first interface, an email including the first authentication information may be transmitted to an email address received from the portable device by performing communication using the second interface.

MODIFIED EXAMPLE 8

The operation unit 12 and the display unit 14 of the MFP 10 may be a so-called touch panel. That is, the operation unit 12 and the display unit 14 of the MFP 10 may be implemented by pieces of hardware configured separately, like in the above described embodiments, or may be implemented by a piece of hardware configured integrally, like in the present modified example. Similarly, the operation unit and the display unit of the portable terminal PT may be implemented by pieces of hardware configured separately, or may be implemented by a piece of hardware configured integrally.

MODIFIED EXAMPLE 9

The MFP 10 and the portable terminal PT may have I/Fs for performing other near field communication such as TransferJet (registered as a trade mark), Bluetooth (registered as a trade mark), or infrared communication, instead of the NFC I/Fs. That is, an apparatus interface and a device interface are not limited to NFC I/Fs, and may be other kinds of I/Fs.

MODIFIED EXAMPLE 10

The function performing apparatus is not limited to the MFP 10 of FIG. 1, and may be a printer capable of performing only a printing function, or may be a scanner capable of performing only a scanning function, or may be a telephone capable of performing a telephone function, or may be a facsimile capable of a facsimileing function, or may be a PC or the like performing a communication function. That is, the specific function is not limited to the copying function and the scanning function, and may be any other function.

MODIFIED EXAMPLE 11

In the above described embodiments, the individual processes of FIG. 3 are implemented by software (that is, the programs 36). However, at least one of the individual processes of FIG. 3 may be implemented by hardware such as logic circuits.

Also, the technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

What is claimed is:

1. A function performing apparatus comprising:
   a function performing unit configured to perform a specific function;
   an operation unit configured to be operated by a user;
   a processor; and
   memory storing computer-readable instructions therein, the computer-readable instructions, when executed by the processor, causing the function performing apparatus to perform:
     receiving a first instruction for registering first authentication information from a portable device,
     receiving use condition information, which indicates a use condition for using the specific function, from the portable device,
     in a case where the first instruction is received, determining, based on a registration condition designated by an administrator and the use condition information, whether the first authentication information for the portable device is to be registered in an authentication memory,
     registering the first authentication information in the authentication memory when determining that the first authentication information is to be registered in the authentication memory,
     transmitting the first authentication information when determining that the first authentication information is to be registered in the authentication memory,
     receiving a second instruction including the first authentication information from the portable device,
     in a case where the second instruction is received while the first authentication information is registered in the authentication memory, changing a state of the function performing apparatus from a non-permission state where use of the specific function is not permitted to a permission state where the use of the specific function is permitted, and
     in a case where the operation unit is operated by a user and second authentication information different from the first authentication information is input to the function performing apparatus while the second authentication information is registered in the authentication memory, changing the state of the function performing apparatus from the non-permission state to the permission state.

2. The function performing apparatus according to claim 1, wherein the determining comprises:
   transmitting a request for registration of the first authentication information in the authentication memory to a registration management apparatus which is used by the administrator,
   receiving a request result from the registration management apparatus in response to the request, and
   in a case where the request result included in the registration condition indicates that the registration of the first authentication information is permitted, determining that the first authentication information is to be registered in the authentication memory.

3. The function performing apparatus according to claim 1,
   wherein the computer-readable instructions, when executed by the processor, cause the function performing apparatus to further perform:
     storing permission condition information, which indicates a permission condition for permitting use of the specific function, in the memory, and
   wherein in a case where the use condition indicated by the use condition information meets the permission condition included in the registration condition, the determining is performed to determine that the first authentication information is to be registered in the authentication memory.

4. The function performing apparatus according to claim 3, wherein the determining comprises:
   in a case where the use condition does not meet the permission condition,
     transmitting a request for registration of the first authentication information in the authentication memory to a registration management apparatus which is used by the administrator, the request including the use condition information,
     receiving a request result from the registration management apparatus in response to the request, and
     in a case where the request result included in the registration condition indicates that registration of the first authentication information is permitted, determining that the first authentication information is to be registered in the authentication memory.

5. The function performing apparatus according to claim 4, further comprising:

a first interface configured to perform communication according to a first communication method; and
a second interface configured to perform communication according to a second communication method different from the first communication method,
wherein the computer-readable instructions, when executed by the processor, cause the function performing apparatus to further perform:
receiving an email address from the portable device by performing communication using the first interface,
wherein the receiving of the first instruction is performed by performing communication with the portable device using the first interface,
wherein in a case where determining that the first authentication information is to be registered in the authentication memory based on the use condition indicated by the use condition information meeting the permission condition indicated by the permission condition information, the transmitting of the first authentication information is performed to the portable device by performing communication using the first interface, and
wherein in a case where determining that the first authentication information is to be registered in the authentication memory based on the request result indicating that registration of the first authentication information is permitted, the transmitting of the first authentication information is performed to transmit an email including the first authentication information to the email address received from the portable device by performing communication using the second interface.

6. The function performing apparatus according to claim 3,
wherein the permission condition information indicates at least the specific function which is permitted to be used.

7. The function performing apparatus according to claim 6, wherein in a case where the use condition indicated by the use condition information is equivalent to the permission condition included in the registration condition or in a case where the use condition indicated by the use condition information is more restricted than the permission condition included in the registration condition, the determining is performed to determine that the first authentication information is to be registered in the authentication memory.

8. The function performing apparatus according to claim 1,
wherein the computer-readable instructions, when executed by the processor, cause the function performing apparatus to further perform:
generating the first authentication information, and
wherein the registering of the generated first authentication information is performed.

9. The function performing apparatus according to claim 1, further comprising:
a first interface configured to operate in any one of a plurality of modes including a first mode and a second mode and to establish a connection with the portable device, thereby performing communication according to a first communication method,
wherein the first instruction is received in a case where the first interface operates in the first mode when the connection with the portable device is established, and
wherein the second instruction is received in a case where the first interface operates in the second mode when the connection with the portable device is established.

10. The function performing apparatus according to claim 1, wherein the memory includes the authentication memory.

11. The function performing apparatus according to claim 1,
wherein the determining is performed to determine whether the first authentication information is to be registered in the authentication memory of a specific device, and
wherein the registering of the first authentication information is performed in the authentication memory of the specific device.

12. The function performing apparatus according to claim 1, wherein the use condition information indicates at least the specific function to be used.

13. A non-transitory computer-readable storage medium storing computer-readable instructions, when executed by the computer, causing a function performing apparatus to perform:
receiving a first instruction for registering first authentication information from a portable device,
receiving use condition information, which indicates a use condition for using a specific function, from the portable device,
in a case where the first instruction is received, determining, based on a registration condition designated by an administrator and the use condition information, whether the first authentication information for the portable device is to be registered in an authentication memory,
registering the first authentication information in the authentication memory when determining that the first authentication information is to be registered in the authentication memory,
transmitting the first authentication information when determining that the first authentication information is to be registered in the authentication memory,
receiving a second instruction including the first authentication information from the portable device, and
in a case where the second instruction is received while the first authentication information is registered in the authentication memory, changing a state of the function performing apparatus from a non-permission state where use of a specific function, which is performed by a function performing unit of the function performing apparatus, is not permitted to a permission state where the use of the specific function is permitted, and
in a case where an operation unit of the function performing apparatus is operated by a user and second authentication information different from the first authentication information is input to the function performing apparatus while the second authentication information is registered in the authentication memory, changing the state of the function performing apparatus from the non-permission state to the permission state.

14. A function performing apparatus comprising:
a function performing unit configured to perform a specific function;
an operation unit configured to be operated by a user;
a first interface configured to perform communication according to a first communication method; and
a second interface configured to perform communication according to a second communication method different from the first communication method,
a processor; and
memory storing computer-readable instructions therein, the computer-readable instructions, when executed by the processor, causing the function performing apparatus to perform:

storing permission condition information, which indicates a permission condition for permitting use of the specific function, in the memory, receiving a first instruction for registering first authentication information from a portable device by performing communication with the portable device using the first interface, receiving use condition information, which indicates a use condition for using the specific function, from the portable device, receiving an email address from the portable device by performing communication using the first interface, in a case where the first instruction is received, determining whether the use condition indicated by the use condition information meets the permission condition included in a registration condition, in a case where it is determined that the use condition indicated by the use condition information meets the permission condition included in the registration condition, determining that the first authentication information is to be registered in an authentication memory, in a case where it is determined that the use condition indicated by the use condition information does not meet the permission condition included in the registration condition,     transmitting a request for registration of the first authentication information in the authentication memory to a registration management apparatus which is used by an administrator, the request including the use condition information,     receiving a request result from the registration management apparatus in response to the request, and     in a case where the request result included in the registration condition indicates that registration of the first authentication information is permitted, determining that the first authentication information is to be registered in the authentication memory, registering the first authentication information in the authentication memory when determining that the first authentication information is to be registered in the authentication memory, in a case where determining that the first authentication information is to be registered in the authentication memory based on the use condition indicated by the use condition information meeting the permission condition indicated by the permission condition information, transmitting the first authentication information to the portable device by performing communication using the first interface, in a case where determining that the first authentication information is to be registered in the authentication memory based on that the request result indicating that registration of the first authentication information is permitted, transmitting the first authentication information to the portable device by transmitting an email including the first authentication information to the email address received from the portable device by performing communication using the second interface, receiving a second instruction including the first authentication information from the portable device, in a case where the second instruction is received while the first authentication information is registered in the authentication memory, changing a state of the function performing apparatus from a non-permission state where use of the specific function is not permitted to a permission state where the use of the specific function is permitted, and in a case where the operation unit is operated by a user and second authentication information different from the first authentication information is input to the function performing apparatus while the second authentication information is registered in the authentication memory, changing the state of the function performing apparatus from the non-permission state to the permission state.

\* \* \* \* \*